Patented Sept. 19, 1950

2,522,547

UNITED STATES PATENT OFFICE 2,522,547

ISOLATION OF USNIC ACID

John B. Stark, Oakland, and Edmund D. Walter, Berkeley, Calif., assignors to the United States of America as represented by the Secretary of Agriculture No Drawing. Application June 7, 1949, Serial No. 97,714

5 Claims. (Cl. 260—338)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the isolation of usnic acid from natural sources thereof. This invention has among its objects the provision of methods for isolating usnic acid from natural sources thereof, particularly California Spanish moss *Ramalina reticulata*. Other objects will be apparent from the description of the invention.

Usnic acid is a compound which has antibiotic activity against a number of pathogenic organisms including *Mycobacterium tuberculosis hominis*. It is a yellow crystalline substance of melting point 195–196° C. and has an empirical formula of $C_{18}H_{16}O_7$.

A good source of usnic acid is the California Spanish moss *Ramalina reticulata*, a lichen of the family Usneaceae which grows as an epiphyte along the west coast of North America from California to Alaska. This plant is in no way related to the Spanish moss of the Southeastern states which is a seed plant of the family Bromeliaceae.

One known process for isolating usnic acid involves extracting the California Spanish moss with acetone or a mixture of acetone and alcohol, evaporating the solution to precipitate the crude usnic acid, then purifying the product by crystallizing from acetone 4 to 5 times. This process is tedious because of the necessity for the repeated crystallizations. It requires handling large volumes of acetone to recover small amounts of usnic acid dissolved in the mother liquors after each crystallization. Moreover, some crops of the moss, depending on maturity, soil conditions, climate, locality where grown, and possibly other factors, contain large amounts of an inert white amorphous material which is a condensation product of beta hydroxybutyric acid. It is virtually impossible to separate this material from the usnic acid by recrystallization from acetone because the amorphous material has practically the same solubility characteristics with regard to acetone as does usnic acid. Thus in each crystallization step the crystals of usnic acid which separate out are contaminated with precipitated amorphous material.

It has now been found that usnic acid can be isolated by a simplified and improved technique. To this end, the moss is extracted with acetone or a mixture of acetone and alcohol and the extract is evaporated to precipitate the crude usnic acid. This crude precipitate is washed with a water-soluble alkanol, then with an aliphatic hydrocarbon solvent and the purified precipitate is crystallized from acetone to give a pure product in high yield. The alkanol and aliphatic hydrocarbon solvent washes have the purpose of removing the inert, white amorphous material mentioned above, sterols, colored materials, and resinous materials which are associated with the crude usnic acid precipitate.

The following example sets forth the process of this invention as applied to specific materials under specific conditions. It is understood that the example is submitted only by way of illustration and not limitation.

EXAMPLE

(a) Extraction of moss with acetone

Two hundred lbs. of ground California Spanish moss of about 20% moisture content was extracted with an equal weight of acetone in a stainless-steel vessel. The extract, which was green by transmitted light and reddish brown by reflected light, was concentrated by evaporation at a temperature of 40° C. and a pressure of 20 in. of mercury. The evaporation was continued until a precipitate appeared in the liquid, the volume of liquid being reduced to about ¼ of original volume. The liquid was then allowed to cool to room temperature then filtered whereby a precipitate of 1 lb. of crude usnic acid was obtained as a brown, resinous mass.

(b) Washing of impure usnic acid with methanol

The crude usnic acid from step (a) was added to 4 gallons of methanol and the mixture boiled for a few minutes. The liquid was allowed to cool slightly then filtered.

(c) Washing of impure usnic acid with petroleum ether

The insoluble material from step (b) was macerated with one liter of petroleum ether and the insoluble material removed by filtration. This process was repeated three more times.

(d) Crystallization of usnic acid from acetone

The insoluble material from step (c) was dissolved in boiling acetone. The solution was filtered while hot, 10% of ethanol added, and the solution allowed to cool to room temperature. The precipitated crystals of usnic acid were separated by filtration.

The mother liquor from the crystallization was subjected to evaporation to remove most of the solvent and then cooled to room temperature. The precipitated material was separated by filtration and washed with petroleum ether and then with methanol. The purified precipitate was then dissolved in hot acetone, filtered while hot, 10% of ethanol added, and the solution allowed to cool whereby a second crop of usnic acid crystals separated out. These were removed by filtration.

The two crops of usnic acid had a total weight of 0.16 lb. and were in the form of yellow crystals having a melting point of 190°–194° C.

In part (a) of the above example, it is preferable to extract the moss at room temperature for reasons of safety. However, it is also possible to use hot acetone in which case a smaller amount may be used as usnic acid is more soluble in hot than in cold acetone. It is preferable to employ acetone itself as the extracting agent as usnic acid is quite soluble in this solvent. Further recovery of acetone itself is simpler than a recovery of a mixed solvent. If desired, a mixture of acetone and alcohol can be used, for example, a mixture of 2 volumes acetone and 1 volume alcohol. The extraction can be performed in many different ways, for example, by batchwise treatment or by continuous treatment or combinations of both. An efficient method of procedure is to place the moss in several vessels and then circulate the solvent through the vessels, the circuit being arranged so that the fresh solvent contacts batches of moss which have already been partly extracted while the substantially saturated solvent is contacted with fresh charges of moss. In this manner, the amount of solvent used is decreased as far as possible by efficient counter-current extraction of the moss. Another method which can be applied is to convey the moss through a trough by a helical screw or perforated belt equipped with baffles while solvent is flowed through the trough in a direction countercurrent to the flow of moss. After the usnic acid extract has been obtained, it is necessary to obtain the usnic acid in the solid state. This is obtained readily by evaporating the extract until the usnic acid precipitates out. This evaporation is preferably performed under vacuum whereby evaporation at a low temperature occurs. However, it is not essential to use vacuum and the evaporation can be performed under atmospheric pressure.

In part (b) of the example the purpose of washing the crude usnic acid precipitate with methanol is primarily to remove the inert white amorphous material and dark-colored resinous materials. It is preferred to perform this extraction at approximately the boiling point of methanol as these impurities are more soluble at this temperature. The proportion of methanol to crude usnic acid is not critical. Generally, a large excess of methanol is used to insure removal of all methanol-soluble impurities. Although methanol is the preferred solvent for this operation, other water-soluble alkanols can be employed, for example, ethanol, propanol, isopropanol, and so forth.

In part (c) of the example, the purpose of washing the crude usnic acid with an aliphatic hydrocarbon solvent is to remove sterols, dark-colored resinous materials and other colored impurities. Although petroleum ether is the preferred solvent many other normally liquid aliphatic hydrocarbons can be used, for example, gasoline, benzine, Stoddard solvent, petroleum naphtha, hexanes, octanes, etc.

In part (d) of the example, ethanol is added to the acetone to reduce the solubility of the usnic acid and thus enhance the crystallization of usnic acid. Although ethanol is preferred for this purpose, other water-soluble alkanols can be employed, for example, methanol, propanol, isopropanol, and so forth. In general the amount of alkanol should be from about 5% to about 20% based on the amount of acetone. In order to obtain a high yield of usnic acid it is preferred to evaporate the mother liquor obtained after the first crystallization. The crude usnic acid which then precipitates is washed as in steps (b) and (c) to remove impurities. In this washing it is preferred to wash first with the aliphatic hydrocarbon solvent and then with the water-soluble alkanol. The so-purified usnic acid is then recrystallized as in the first instance.

Having thus described our invention, we claim:

1. A process for isolating usnic acid from California Spanish moss which comprises extracting the moss with acetone, concentrating the acetone extract to precipitate the crude usnic acid, washing the precipitate with a water-soluble alkanol and then with an aliphatic hydrocarbon solvent to dissolve and remove impurities therefrom, and crystallizing the usnic acid from solution in acetone.

2. A process for isolating usnic acid from California Spanish moss which comprises extracting the moss with acetone, concentrating the acetone extract to precipitate the crude usnic acid, washing the precipitate with methanol and then with an aliphatic hydrocarbon solvent to dissolve and remove impurities therefrom.

3. Process in accordance with claim 2 wherein the aliphatic hydrocarbon solvent is petroleum ether.

4. The process of claim 3 in which the petroleum ether insoluble material is dissolved in hot acetone, alcohol added, and the solution cooled to precipitate usnic acid crystals.

5. A process of isolating usnic acid from California Spanish moss in which the moss is extracted with acetone, and the solution evaporated to precipitate crude usnic acid, the improvement comprising washing the latter with boiling methanol, treating the insoluble usnic acid material with petroleum ether, dissolving the insoluble material in a hot mixture of acetone and 5 to 20 percent water-soluble alkanol, evaporating and cooling to precipitate purified usnic acid.

JOHN B. STARK.
EDMUND D. WALTER.

REFERENCES CITED

The following references are of record in the file of this patent:

Widman, Annalen, vol. 310, pages 230–233 (1900).